US009539862B2

(12) United States Patent
Bournat et al.

(10) Patent No.: US 9,539,862 B2
(45) Date of Patent: Jan. 10, 2017

(54) TREAD WITH REDUCED ROAD NOISE

(75) Inventors: Alexis Bournat, Clermont-Ferrand (FR); Benoit Foucher, Clermont-Ferrand (FR); Didier Michel Martin, Clermont-Ferrand (FR); Benjamin Quantinet, Clermont-Ferrand (FR)

(73) Assignees: COMPAGNIE GENERALE DES ETABLISSEMENTS MICHELIN; MICHELIN RECHERCHE ET TECHNIQUE S.A.

( * ) Notice: Subject to any disclaimer, the term of this patent is extended or adjusted under 35 U.S.C. 154(b) by 796 days.

(21) Appl. No.: 13/704,031

(22) PCT Filed: Jun. 29, 2011

(86) PCT No.: PCT/EP2011/060883
§ 371 (c)(1),
(2), (4) Date: Feb. 5, 2013

(87) PCT Pub. No.: WO2012/001031
PCT Pub. Date: Jan. 5, 2012

(65) Prior Publication Data
US 2013/0153105 A1    Jun. 20, 2013

(30) Foreign Application Priority Data

Jun. 29, 2010 (FR) ...................................... 10 55192

(51) Int. Cl.
*B60C 11/03* (2006.01)
*B60C 11/04* (2006.01)
*B60C 11/13* (2006.01)

(52) U.S. Cl.
CPC .......... *B60C 11/042* (2013.04); *B60C 11/0309* (2013.04); *B60C 2011/0372* (2013.04);
(Continued)

(58) Field of Classification Search
CPC ........ B60C 11/03; B60C 11/032; B60C 11/04; B60C 11/042; B60C 11/13;
(Continued)

(56) References Cited

U.S. PATENT DOCUMENTS 4,362,201 A * 12/1982 Zinnen et al. ........... 152/209.22
4,955,415 A *  9/1990 Takeuchi et al. ........ 152/209.21
(Continued)

FOREIGN PATENT DOCUMENTS

DE    102006031779 A1    1/2008
FR         1305928 A     10/1962
(Continued)

OTHER PUBLICATIONS

International Search Report (PCT/ISA/210) issued on Aug. 5, 2011, by the European Patent Office as the International Searching Authority for International Application No. PCT/EP2011/060883.

*Primary Examiner* — Eric Hug
(74) *Attorney, Agent, or Firm* — Dickinson Wright PLLC

(57) ABSTRACT

Tire for heavy goods vehicle having a tread comprising a plurality of circumferential grooves delimiting intermediate ribs and two edge ribs each circumferential groove comprising a plurality of protuberances formed as a protrusion on at least one lateral wall delimiting this groove, wherein:

facing each protuberance, a half-closed notch has an axial length La at most equal to 60% of the minimum width Ln of this rib, and a width Le at most equal to the width Lr of the groove oriented so as to make an average angle B at least equal to 10 degrees with the main direction of the protuberance, each protuberance closes the section of the groove in which it is formed over at least 35% and at most 75% of the surface of the said section, a functional clearance (J1, J2) is arranged between the protuberance and the walls delimiting the half-closed notch.

5 Claims, 2 Drawing Sheets

(52) U.S. Cl.
CPC .............. B60C 2011/133; B60C 2011/1338; B60C 11/047; B60C 11/0306; B60C 11/0309; B60C 2011/0358; B60C 2011/0372; B60C 2011/0381; B60C 2011/0383; B60C 2011/0386; B60C 2011/0388 *B60C 2011/0383* (2013.04); *B60C 2011/0388* (2013.04); *B60C 2011/1213* (2013.04); *B60C 2011/133* (2013.04); *B60C 2011/1338* (2013.04)

(58) Field of Classification Search
USPC .... 152/209.19, 209.21, 209.22, 209.17, 900, 152/901
See application file for complete search history.

(56) References Cited

U.S. PATENT DOCUMENTS

| | | | | |
|---|---|---|---|---|
| 4,982,774 | A * | 1/1991 | Evertz ...................... | 152/209.18 |
| 6,119,744 | A * | 9/2000 | Tsukagoshi ......... | B60C 11/0309 |
| | | | | 152/209.19 |
| 2009/0145529 | A1* | 6/2009 | Miyazaki ............ | B60C 11/0309 |
| | | | | 152/209.21 |
| 2011/0126952 | A1* | 6/2011 | Nakamizo ........... | B60C 11/0306 |
| | | | | 152/209.21 |

FOREIGN PATENT DOCUMENTS

| | | | |
|---|---|---|---|
| JP | 7-17216 A | | 1/1995 |
| WO | WO 2009/082394 | * | 7/2009 |
| WO | WO 2009/084666 A1 | | 7/2009 |

* cited by examiner

TREAD WITH REDUCED ROAD NOISE

FIELD OF THE INVENTION

The present invention relates to tyre treads for heavy goods vehicles and more particularly tyres designed to be fitted to the driving axle.

DESCRIPTION OF THE PRIOR ART

The tyres for heavy goods vehicles must satisfy several requirements in terms of performance and notably grip performance and steerability performance (the ability to follow a given trajectory). For this purpose, it is usual to provide a tyre tread with a plurality of grooves of generally circumferential orientation, these grooves delimiting a plurality of continuous ribs. These grooves serve both as channels for draining the water covering a roadway in rainy weather and also as available volume for storing at least temporarily a certain volume of water. In the case of tyres fitted to the driving axle of a vehicle, the tyres are also subjected to driving torques that it is essential to be able to transmit via the tyres to the roadway on which the vehicle is running. Consequently, it is known practice to provide a tread sculpture design that has circumferential continuities; this is achieved by the presence of continuous ribs in the circumferential direction.

Another of the requirements to be satisfied in the matter of technical performance of a tyre relates to the noise that this tyre generates when running and notably the noise of resonance inside the grooves during contact with the roadway.

This performance is determined in standard tests for measuring the noise emitted when running without torque ("coast-by") and with torque ("drive-by"). These tests measure the noise level when a vehicle passes at a distance of 7.5 m. These tests are described in the following documents: directive 2001/43/CE, 1S013325 (2003), 1S0362-1 (2007), 1S0362-1 (2007) COR1 (2009), ISO 362-2 (2009).

In a known manner, see in particular document WO 2009084666 A, it is possible to reduce the noise of resonance in the circumferential grooves by providing the said grooves with a plurality of studs or protuberances supported by the bottom of the grooves or the lateral walls of the said grooves. However, in order to be fully effective in reducing road noise, these studs must occupy the whole cross section of these grooves or at least a large proportion of their cross section. It is clear that, in so doing, the drainage performance reduces considerably.

Reconciling these two performances in one and the same tread design is the problem that the present invention proposes to solve.

Document WO 2009084666 A shows a tyre of which the tread comprises a plurality of grooves of generally circumferential orientation and grooves of transverse orientation, these grooves delimiting blocks of material. In order to attenuate the road noise, provision is made to place in certain circumferential grooves a plurality of protuberances designed largely to close off the cross section of the said transverse grooves. Each protuberance is located opposite a transverse groove.

This type of tread design applied to a tyre for a heavy goods vehicle is incompatible with good wear performance since it leads to the presence of blocks that are capable of generating irregular wear, that is to say wear that is no longer uniform and regular over the whole tread surface of the tyre.

DEFINITIONS

An incision is a cut-out designed to close when coming into contact with the roadway.

A block is an element in relief formed on the tread that is delimited by hollows or grooves and comprising lateral walls and a contact face designed to come into contact with the roadway.

"Radial direction", in the present document, means a direction that is perpendicular to the axis of rotation of the tyre (this direction corresponds to the direction of the thickness of the tread).

"Axial or transverse direction" means a direction parallel to the axis of rotation of the tyre.

"Circumferential direction" means a direction that is perpendicular to both the axial direction and a radial direction.

"Axially towards the outside" means a direction that is oriented towards the outside of the internal cavity of the tyre.

"Equatorial plane": a plane perpendicular to the axis of rotation and passing through the points of the tyre that are axially outermost, this equatorial plane virtually dividing the tyre into two substantially equal halves.

SUMMARY OF THE INVENTION

The object of the present invention is to obtain a tyre to be fitted to a heavy goods vehicle, that has both a good road-noise performance and even wear over the whole of its tread.

Accordingly, the subject of the invention is a tyre for a heavy goods vehicle, this tyre comprising a tread of which a tread surface is designed to come into contact with a roadway, this tread comprising a plurality of circumferential grooves delimiting intermediate ribs and two edge ribs. Each rib has a minimum width Ln and comprises two lateral walls and a contact face designed to come into contact with a roadway, each circumferential groove comprising a plurality of protuberances formed as a protrusion on at least one lateral wall delimiting this groove in order to partly obstruct the cross section of the circumferential groove in question. This tread is characterized in that:

facing each stud, on the adjacent rib delimiting the groove in question, a half-closed notch is provided having an axial length La at most equal to 60% of the minimum width Ln of this rib (this minimum width being measured between two hollows of the same rib when there are any), this half-closed notch with a width Le at most equal to the width Lr of the groove being oriented so as to make an average angle B at least equal to 10 degrees with the main direction of the protuberance with which this notch interacts, and in that each protuberance closes the section of the groove in which it is formed over at least 30% and at most 75% of the surface of the said section, and in that a functional clearance is arranged between the protuberance and the walls delimiting the notch with which this protuberance is designed to interact, in order to allow the passage of fluid, notably when running on a water-covered roadway.

By virtue of this combination, it is possible to reduce the noise of resonance generated in the grooves when passing in contact with the roadway by combining both a reduction of cross section, through the presence of studs partly blocking the said grooves and a volume serving both as a resonator and as a storage element for the water. It is also essential that each protuberance has an average orientation different from the average orientation of the notch that is placed facing it and that this protuberance leaves a sufficient passageway between itself and the walls of the said notch. The length of the notch is determined so as not to overcompromise the rigidity of the rib on which it is made. Moreover, the volume of each notch is determined so as to confer a volume that is appropriate to the storage at least in part of the water flowing in the groove into which the said notch leads. Therefore, it is simultaneously possible to reduce the noise generated in each groove by combining both a partial closure of each groove with an appropriate number of protuberances that do not flex solely under the pressure of the air and the presence of a sort of cavity playing the role of a resonator of which the volume is appropriate for counteracting certain resonance frequencies.

Preferably, the intermediate ribs have no transverse grooves opening into two circumferential grooves.

Preferably, each protuberance closes the section of the groove in which it is formed over at least 50% and at most 75% of the surface of the said section and yet more preferably between 65% and 75% (inclusive).

Beyond 75%, there is too great a reduction in the flow of liquid in the groove when running on water-covered ground.

Preferably, a tread according to the invention comprises a plurality of circumferential grooves in zigzag form delimiting intermediate ribs and two edge ribs having a succession of peaks and hollows in the circumferential direction, the protuberances in each groove being formed at the peaks in order to partly obstruct the cross section of the circumferential groove in question while the notches are formed to lead into the hollows.

It is advantageous that the protuberances have dimensions that are appropriate for not flexing under the action of a flow of water in the grooves in order to direct the flow towards the half-closed notches.

Preferably, the number of protuberances for each groove is such that at least four protuberances and four half-closed notches are permanently present in contact with the roadway.

Preferably, the functional clearance between each protuberance and the walls of the half-closed notch with which this protuberance interacts is in total at least equal to the width Lr of the groove in which protuberances are formed. "In total" should be understood to be the total of the clearances on each side of a protuberance.

Advantageously, the protuberances have a rigidity that is appropriate so as not to retract or flex under the effect of the pressure exerted by the water when water flows in the grooves. In this manner, and also by virtue of the functional clearance between each protuberance and the facing rib, it is possible to divert the flow of liquid in the direction of the half-closed notch, which forms a sort of reservoir for temporarily storing a quantity of liquid. It is this same quantity of liquid that is prevented from flowing in the circumferential groove because of the presence of the protuberances.

Preferably, each protuberance extends between the bottom of a groove and the tread surface in the new state, the base of this protuberance being closer to the wall of the opposite rib delimiting the same rib than the outermost portion of the same protuberance in order to generate an inclined front ridge. The base of each protuberance may be extended outwards by a first portion of constant length before gradually reducing to the tread surface. It is advantageous that the length of the base Lpi of each protuberance is at least equal to 60% of the width of the groove Lr in which it is formed and the axial length Lps of the outermost portion of the protuberance is at least equal to 20% and at most equal to 50% of the same width of groove Lr. These percentages are given when the tyre is new, that is to say has not yet been used.

The invention is particularly effective when at least four protuberances and at most approximately twenty protuberances are provided for each groove permanently in contact of the tyre with the roadway for each groove. These figures are understood to relate to the conditions of use of the tyre as defined by the E.T.R.T.O. standard, that is to say to the benchmark inflation pressure corresponding to the load capacity of the tyre indicated by its load index and its speed code.

Other features and advantages of the invention will emerge from the description made below with reference to the appended drawings which, as non-limiting examples, show embodiments of the subject of the invention.

DESCRIPTION OF THE FIGURES

In order to make the figures easier to read, the same reference symbols may be employed for the description of variants of the invention when these reference symbols refer to elements of one and the same kind whether it be structural or functional.

Figure 1:
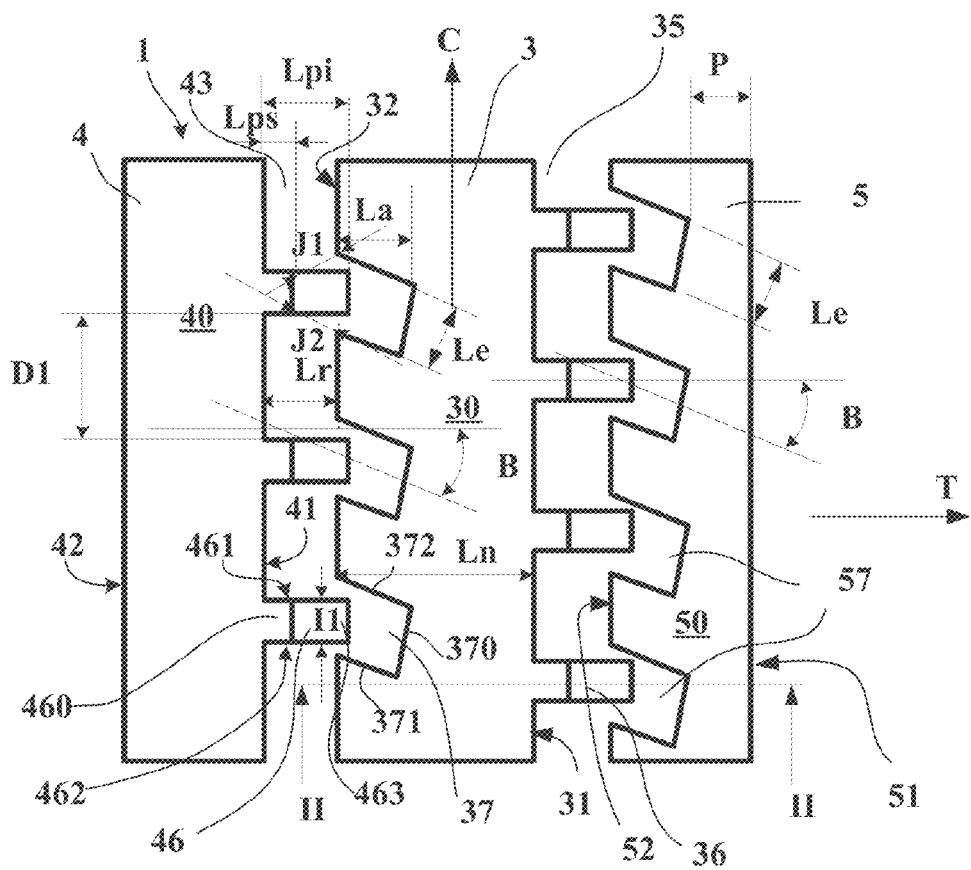
FIG. 1 represents a plan view of a tyre tread according to the invention comprising rectilinear circumferential grooves.

FIG. 1 represents a plan view of a tyre tread according to the invention comprising rectilinear circumferential grooves. This FIG. 1 shows a partial plan view of a tread 1 comprising three ribs delimiting two rectilinear grooves 43, 35 of circumferential orientation. The circumferential direction is indicated by the arrow C. Amongst the ribs, there is one intermediate rib 3 and edge ribs 4, 5.

Each rib 3, 4, 5 comprises contact faces 30, 40, 50 respectively designed to come into contact with a roadway when running and lateral faces 31, 32, 41, 42, 51, 52 respectively, these lateral faces intersecting the said contact faces in order to form circumferentially oriented ridges.

The lateral wall 41 of the edge groove 4 comprises a plurality of protuberances 46 that are separated from one another by a distance D1 in the circumferential direction. In the present case, these protuberances 46 are oriented so as to be perpendicular to the lateral wall 41 of the rib 4 (these protuberances are consequently perpendicular to the wall surface 41). The distance D1 is chosen so that there are at least four protuberances 46 in contact with a roadway in the conditions of use. Each protuberance 46 comprises an external face 460 designed to come into contact with the roadway when running (in the example described, this external face 460 is at the contact face 40 of the edge rib 4). Each protuberance 46 has a surface length Lps measured in the new state of the tyre in the main direction of the said protuberance (that is to say in the present case in a direction perpendicular to the lateral face 41) and a width Lpi measured at the bottom of the groove 43.

Preferably, the length Lps of the upper face of each protuberance is between 20% and 50% of the width Lr of the groove in which this protuberance is formed. Moreover, the length of the base Lpi of the protuberance 46 (the length of the portion of the protuberance at the bottom of the groove) is at least equal to 60% (when new) of the width Lr of the groove.

Figure 2:
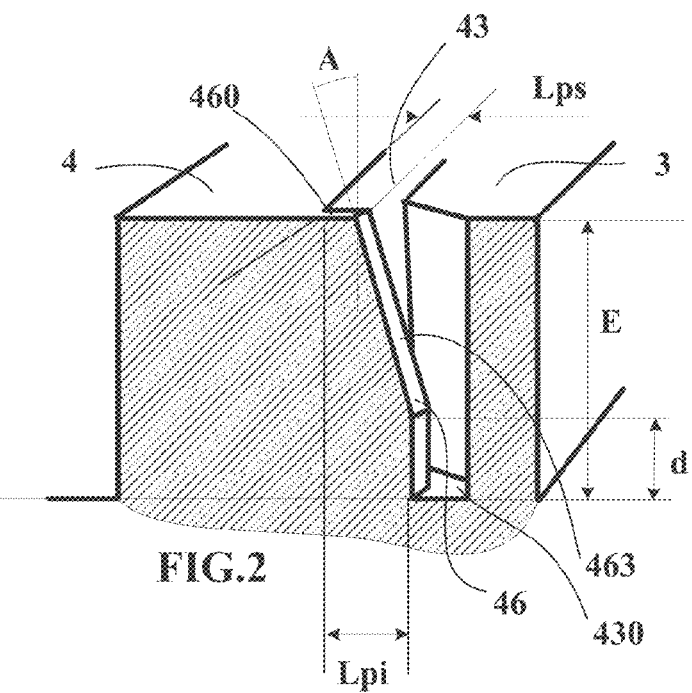
FIG. 2 represents a view in section along the line II-II taken from FIG. 1.

Each protuberance, as can also be seen in FIG. 2 representing a view in section along the line II-II taken from FIG. 1, extends between the bottom 430 of the groove 43 and the contact face 40 of the edge rib 4. The length Lps of the protuberance 46 is less than the length LPi of the same protuberance measured at the bottom of the groove 43. In the present case, this protuberance 46 closes off the section of the groove 43 over 75% of the said section. The thickness I1 of the protuberances 46 (measured in the circumferential direction) is in this instance identical for all the protuberances and constant over the whole height of the said protuberances.

Each protuberance 46 comprises lateral faces 461, 462 that are at a distance from one another by the thickness I1 of the protuberance; these two lateral faces join in an end face 463 which is inclined with an angle A close to 30° relative to a radial direction (that is to say a direction passing through the axis of rotation of the tyre). Preferably, this thickness I1 is between 15% and 40% of the width Lr of the groove 43 in which the protuberance is made. Each protuberance comprises a portion close to the bottom 430 of the groove that is oriented radially; this portion extends over a height d that in this instance is equal to 20% of the depth of the groove (preferably this height is less than 50% of this depth).

Each protuberance 46 has a main orientation determined on the external face 460 to be the direction of the straight line linking a mid-point of the said face taken on the rib supporting the protuberance and an end point on the same external face 460 furthest away from the said rib.

Facing each protuberance, a half-closed notch is made on the intermediate rib 3, that is to say a notch 37 that opens only onto a lateral face 31 of the rib 3, this lateral face 31 facing the lateral face 41 on which the protuberances 46 described above are formed. Each notch 37 has a main orientation inclined at an angle B with the axial direction (this axial direction indicated by the arrow T in the figure being perpendicular to the circumferential direction C); this main orientation of the notch 37 is determined to be the average of the orientations of the walls 371, 372 delimiting the said notch. This angle B measures the difference in orientation between the main orientation of the protuberance and the main orientation of the half-closed notch. Advantageously, this difference in orientation is greater than zero degrees and at most equal to 70°. In the case shown, the protuberance is orientated in the transverse direction T; it is naturally possible to incline this protuberance with a small angle (less than 30°) and in this case maintain a sufficient angular difference with the half-closed notch with which it interacts.

This half-closed notch 37 is precisely closed by an end wall 370 which connects the two lateral walls 371, 372. The width Le of each notch 37 is appropriate for each notch 37 to open onto the groove 43 and form a storage volume that is greater than the volume occupied by the protuberance 46 with which it interacts.

By virtue of the functional clearances J1 and J2 separating the points closest to the upper face 460 of each protuberance of the lateral face 32 of the intermediate rib 3, it is possible, when running on a water-covered roadway, to fill the half-closed notch with the water flowing in the groove 43. This storage is temporary since when the notch is no longer closed by the roadway the water contained in this notch is ejected by centrifugal force.

As is visible in FIG. 1, the other groove 35 is also provided with a plurality of protuberances 36 formed on the lateral face 32 of the intermediate rib 3. These protuberances 36 are intended to interact with a plurality of half-closed notches 57 formed on the edge rib 5. The geometrical characteristics of these protuberances 36 are similar to those of the protuberances 46.

Whether for the groove 43 or the groove 35, the protuberances 46, 36 respectively are at a distance circumferentially by one and the same average distance D1.

Whether on the intermediate rib 3 or the edge rib 5, the half-closed notches 37, 57 respectively partially occupy the width of the said ribs so as to reserve a width providing the continuity of the ribs and thus preventing the closure of the said notches when coming into contact with the roadway.

In this variant shown with FIGS. 1 and 2, the ribs have no transverse grooves leading into two circumferential grooves; in a variant not shown here, it is possible to have, in addition to the grooves opening onto a single groove and facing the protuberances, grooves leading into two circumferential grooves. It is also possible to provide for the presence of sipes of a geometry that is appropriate to create a mechanical blockage of one wall against the facing wall.

Figure 3:
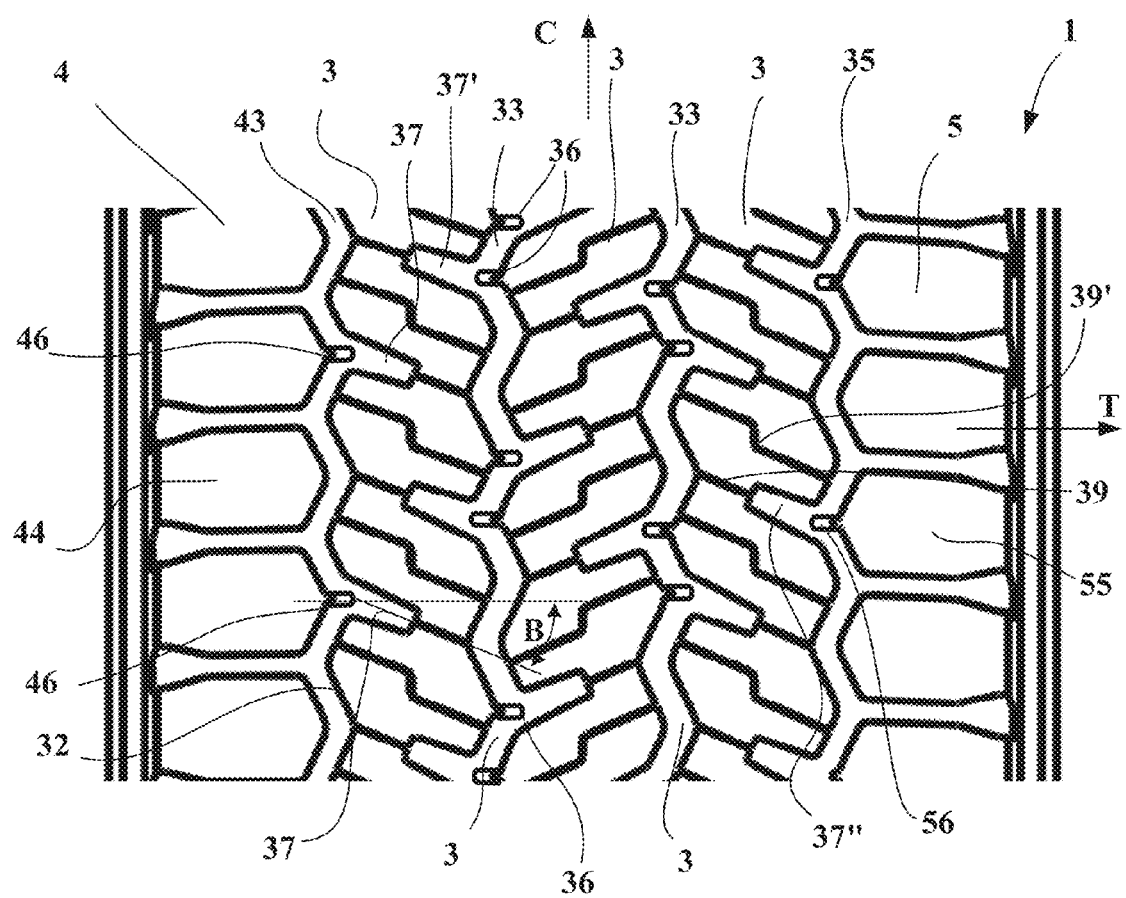
FIG. 3 shows another variant of a tyre tread according to the invention comprising grooves in zigzag form.

FIG. 3 shows another variant of a tyre tread according to the invention comprising grooves in zigzag form.

FIG. 3 shows the tread surface of a tyre tread 1 of dimension 245/70 R 17.5 provided with four circumferential grooves 43, 33, 35 having a geometry in zigzag form formed by a succession of peaks and hollows. These zigzag grooves delimit three intermediate ribs 3 and two rows 4, 5 forming the edges of the tread.

The edge rows 4, 5 are also provided with transverse grooves to form a plurality of blocks 44, 55 respectively. The circumferential grooves 43, 35 delimiting the edge ribs 4, 5 have an average width equal to 7 mm and 8 mm for the other grooves (measured perpendicularly to the adjacent ribs or blocks) is provided with a plurality of devices according to the invention to reduce the noise of rolling resonance while retaining good water-drainage performance when running on a water-covered roadway. In the present case, the intermediate ribs 3 or the blocks of edge rows have peaks and hollows in alternation in the circumferential direction. In each groove, an anti-noise device consists of a protuberance 46, 36, 56 formed on a peak and of a half-closed notch 37, 37', 37" opening opposite the said protuberance in order to be able to interact with it to reduce the resonance noise and provide appropriate storage of liquid.

In the nominal conditions of use of this tyre, that is to say at an inflation pressure equal to 8 bar and under a load of 2240 kg, the average length of the contact area (172 mm) determines the number of these anti-noise devices on the tread. Specifically, in order to have an anti-noise effect, it is necessary to modify the resonance frequency of the grooves by ensuring that each groove has in contact at least one anti-noise device (a device comprising a protuberance and a half-closed notch). In the present case, each protuberance 46, 36, 56 closes off the section of the groove in which it is formed over approximately 50% of the said section. Each protuberance 46, 36, 56 extends between the bottom of the groove and the tread surface in the new state. In the present case, there are 4 anti-noise devices in the edge grooves and 9 anti-noise devices in the intermediate grooves permanently in contact (preferably, between 4 and 12 studs per groove are provided in the contact area).

All the protuberances 46, 36, 56 have the same geometric dimensions in the present case. The length Lps of each protuberance 46 measured on the tread surface is less than the length LPi of the same protuberance measured at the bottom of the groove 43; in the present case, the length Lps is equal to 30% of the groove width (preferably between 20 and 50%) and the length Lpi is equal to 60% of the groove width (preferably greater than 50%).

The thickness of each protuberance (measured in the circumferential direction) is in this instance identical for all the protuberances and constant over the whole height of the said protuberances. This thickness is 2 mm on average.

Moreover, and facing each protuberance 46, made on each intermediate rib 3 is a half-closed notch, that is to say a half-closed notch 37 that opens axially on only one lateral face 32 of the rib 3, this lateral face 32 facing the lateral face on which the protuberances mentioned above are formed. Each notch 37 has a main orientation that is inclined at an angle B with the axial direction (this axial direction indicated by an arrow T in FIG. 3 being perpendicular to the circumferential direction C). This angle B measures the difference of orientation between the main orientation of the protuberance and the main orientation of the half-closed notch. In the present case, this angle B is 23° (preferably this angle is between 10 and 50°).

In the example described with the support of this FIG. 3, it can be seen that the two grooves 33 that are closest to the equatorial plane have a larger number of anti-noise devices when compared with the number of devices in the grooves closer to the edge rows (in this instance the number is more than doubled). By virtue of these devices, it is possible to modify the specific resonance frequencies of the grooves and it is advantageous that these frequencies be different between the grooves of the mid-portion of the tread (on either side of the equatorial plane) and the grooves adjacent to the edges of the tread. On each of the two grooves closest to the equatorial plane, the protuberances (and the half-closed notches that interact with these protuberances) are formed in alternation on one wall delimiting the said groove and on the other wall facing it. The additional advantage of this configuration is that it does not adversely affect the mechanical resistance to attacks of the edges of the tread by the use of a reduced number of anti-noise devices according to the invention.

Figure 4:
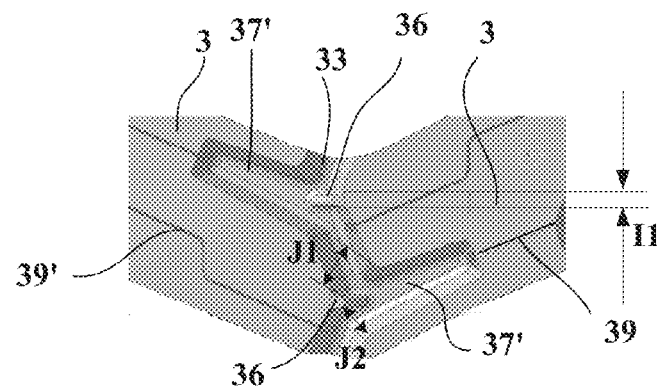
FIG. 4 shows, for the latter variant, a local view.

FIG. 4 shows, for this last variant, a local view in elevation. In this FIG. 4, there is a portion of a groove 33 between two ribs 3; in an alternating manner, a protuberance 36 is formed on a peak of a rib and in combination, a half-closed notch 37', this notch 37' being extended by a sipe 39 of which the walls have zigzag geometries in order to interact between it when coming into contact. A sipe 39' is also provided passing through the whole width of each rib 3.

The average width of each protuberance is in this instance equal to 25% of the width of the half-closed notch (preferably between 15% and 40%) or approximately 2 mm. The total clearance between each protuberance and the adjacent rib is greater than the width of the circumferential groove (in the case of this variant, the total clearance is 9 mm).

The axial length of the half-closed notch 37' is substantially equal to half the width of the rib in which it is formed ("axial length" means the length of the projection of the notch over the axial direction T).

It should also be noted in FIG. 3 that the half-closed notches are on one and the same rib oriented in the same manner and that they are inclined in an opposite manner on two adjacent ribs 3. Thus, the drawing of the tread is not directional, that is to say that it does not impose a preferred running direction. Naturally, those skilled in the art can use this invention for a design that is directional by appropriate inclinations of the half-closed notches.

On the edges, provision is also made for the blocks to be connected together by bridges of material in order to have a substantially continuous edge.

Naturally, the invention is not limited to the examples described and represented and various modifications can be made thereto while remaining within the scope of the claims.

The invention claimed is:

1. A tire for a heavy goods vehicle axle, comprising a tread of which a tread surface is designed to come into contact with a roadway, this tread comprising a plurality of circumferential grooves delimiting intermediate ribs and two edge ribs, the intermediate ribs having no transverse grooves opening into two circumferential grooves, each rib having a minimum width Ln and comprising two lateral walls and a contact face designed to come into contact with a roadway, each circumferential groove comprising a plurality of protuberances formed as a protrusion on at least one lateral wall delimiting this groove in order to partly obstruct the cross section of the circumferential groove in question, this tread comprising:

facing each protuberance, on the adjacent rib delimiting the groove in question, a half-closed notch having an axial length La at most equal to 60% of the minimum width Ln of this rib, this half-closed notch with a width Le at most equal to the width Lr of the groove being oriented so as to make an average angle B at least equal to 10 degrees with the main direction of the protuberance with which this notch interacts, wherein protuberance closes the section of the groove in which it is formed over at least 30% and at most 75% of the surface of the said section, and wherein a functional clearance (J1, J2) is arranged between the protuberance and the walls delimiting the half-closed notch with which this protuberance is designed to interact, in order to allow the passage of fluid, notably when running on a water-covered roadway, and each protuberance extends to an opening of a corresponding half-closed notch.

2. The tire according to claim 1 wherein its tread comprises a plurality of circumferential grooves in zigzag form delimiting intermediate ribs and two edge ribs having a succession of peaks and hollows in the circumferential direction, the protuberances in each groove being formed at the peaks in order to partly obstruct the cross section of the circumferential groove in question while the notches are formed to lead into the hollows.

3. The tire according to claim 1 wherein the protuberances have dimensions that are appropriate for not flexing under the action of a flow of water in the grooves.

4. The tire according to claim 1 wherein the number of protuberances for each groove is such that at least four protuberances and four half-closed notches are permanently present in contact with the roadway.

5. The tire according to claim 1 wherein the functional clearance between each protuberance and the walls of the half-closed notch with which it interacts is in total at least equal to the width Lr of the groove in which these protuberances are formed.

* * * * *